Oct. 19, 1971     J. A. BUSH     3,613,223

METHOD AND APPARATUS FOR MAKING FLUID SEALS

Original Filed June 22, 1966     2 Sheets-Sheet 1

INVENTOR:
JACK A. BUSH
BY Robert Henderson
attorney

INVENTOR:
JACK A. BUSH

United States Patent Office

3,613,223
Patented Oct. 19, 1971

3,613,223
METHOD AND APPARATUS FOR MAKING FLUID SEALS
Jack A. Bush, Birmingham, Mich., assignor to Garlock Inc.
Continuation of application Ser. No. 559,549, June 22, 1966. This application Oct. 13, 1969, Ser. No. 866,167
Int. Cl. B23p *17/00, 25/00*
U.S. Cl. 29—527.1      4 Claims

ABSTRACT OF THE DISCLOSURE

The method and apparatus of this invention provide for so engaging a sidewall of metal shell with a die member as to prevent radial shifting of the shell and to prevent distortion of an outer cylindrical wall thereof while an annular rubber sealing element is being molded to the inner margin of said sidewall.

---

This application is a continuation of application Ser. No. 559,549, filed June 22, 1966, now abandoned, entitled "Method and Apparatus For Making Fluid Seals."

This invention relates to the manufacture of fluid seals such as are employed to prevent leakage of fluid along a rotary shaft or a reciprocating rod, and, more particularly, relates to a method and apparatus for applying an elastomer, shaft or rod engaging sealing element to a metal shell which is to be fitted tightly into a machine casing opening through which the shaft or rod extends. As the elastomer employed is usually rubber or synthetic rubber, the term "rubber" is employed herein to comprehend all elastomeric material which is usable as hereinafter set forth.

An important object of this invention is to provide for so applying or bonding the rubber sealing element to an annular flange on the metal shell that the rubber firmly engages and is bonded to the inner edge of said flange and to annular surfaces adjoining said edge at opposite faces of the flange.

Another important object is to provide a method and means by the use of which the sealing element may be applied to the shell without material flashing of rubber material onto the metal of the shell beyond the intended disposition of the rubber.

These and other more or less apparent objects are achieved by the use of this invention wherein a first concentric annular ridge, on one of two coacting die members, supports and, by engaging a shoulder on the shell centers the latter while a second concentric annular ridge and an adjacent annular surface on the other die member operate, when the die members are brought together, to cause the shell to be held firmly between the two ridges. The second ridge has a circular edge which, during closing of the die members, engages a top surface of an obliquely upwardly extending annular flange of the shell at a circular line outwardly of the edge of the flange to press the latter to a more nearly flat condition, leaving areas at the edge and at both the bottom and top faces of said flange for reception of rubber during the formation, by the die members, of a rubber sealing element on the flange of the metal shell.

Several embodiments of the apparatus of this invention are illustrated in the accompanying drawing without, however, limiting the invention to those particular embodiments.

Figure 1:
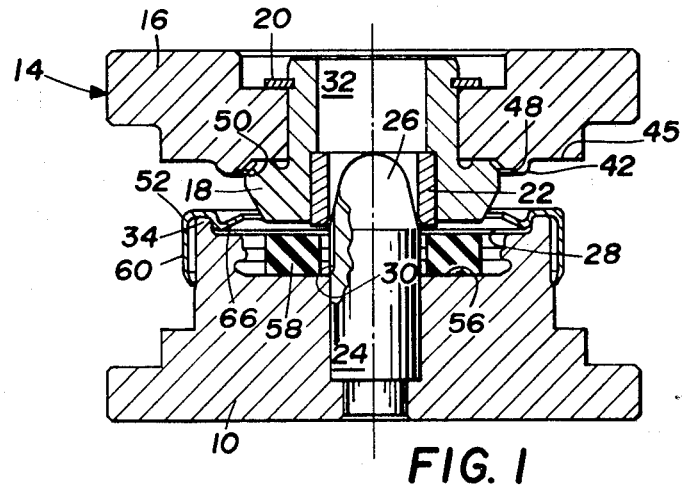
FIG. 1 is a central, axial sectional view of a preferred embodiment of die apparatus according to this invention with a metal shell and rubber blank in place therein in readiness for operation of said apparatus for forming the rubber blank into a rubber sealing element upon said shell.

Referring to the first embodiment, illustrated in FIGS. 1–5, the apparatus comprises a lower die member 10, suitably held down upon a supporting table (not shown), and an upper die assembly 14, suitably fixed to the underside of a vertically movable plunger (not shown), which assembly comprises an upper, outer die member 16, an upper, inner die member 18, a retaining ring 20, holding the two upper die members securely together, and a bushing 22 fitted tightly into a counterbore in the bottom of the member 18.

All of the parts 10 and 14–22 are annular, are of uniform sectional shape at all points therearound, said sectional shapes being as illustrated, and are interrelated as shown in the drawing.

The apparatus further comprises a die centering pin 24, suitably fixed tightly in a central bore in the lower die member 10 and having a dome-topped, upper portion 26 projecting upwardly from said member. The upper end portion 26 of the centering pin is of such diameter that it fits into the bushing 22 with a close, sliding fit, to provide and maintain very precise coaxial relationship between the upper and lower die members when the latter are closed by the upper die assembly being moved downwardly into molding coaction with the lower die member.

Figure 4:
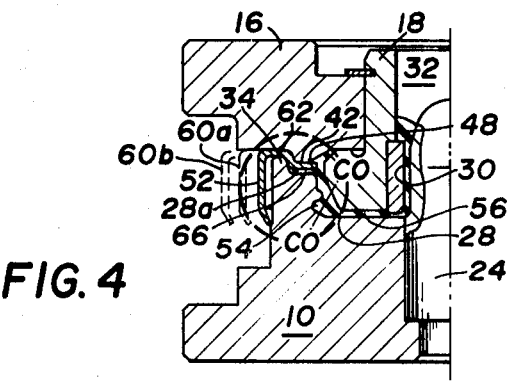
FIG. 4 is a view, substantially similar to FIGS. 2 and 3, with the parts as in final positions of a molding operation by which a rubber sealing element has been applied to the shell.

When the die members are closed, inner surfaces thereof combine to form a rubber shaping cavity 28, shown in FIG. 4 as filled with rubber. The die-centering pin 24 is formed with a flute 30 which communicates with the cavity 28 and permits escape of excess rubber therefrom to an open area 32 within the bushing 22 and above the pin 24, when the die members are closed as in FIG. 4.

The lower die member 10 is formed with an upstanding, substantially cylindrical, shell-centering ridge 34 having a substantially flat top surface 36, and an inner side surface 38. The surface 38 adjoins the surface 36 and also adjoins an annular, inwardly extending surface 40 of said die member, which latter surface partly defines the rubber shaping cavity 28.

The upper outer die member 16 is formed with a depending annular ridge 42 having an outer side surface 44 adjoining a flat bottom surface 46 preferably inwardly terminating abruptly and adjoining an angularly edged shoulder 48 which, with a further adjoining, annular surface 50, partly defines the rubber shaping cavity 28.

The depending ridge 42 of the upper die member 16 is of a lesser diameter than the upstanding ridge 34 of the lower die member 10, the respective side surfaces 44 and 38 of said ridges having diameters differing to an extent only slightly greater than the thickness of the metal of a shell 52 to which a rubber sealing element 54 is to be affixed by operation of the several die members.

The height of the ridge 42, as measured from the flat surface 45 of the upper die member 16 is less than the height of the ridge 34, as measured from the flat surafce 40 of the lower die member 10, so that when the dies are closed upon the shell 52, as hereinafter explained, a portion 28a of the cavity 28 is open for reception therein of a portion of rubber which will constitute a part of the sealing element 54.

The lower die member 10 has a flat inner surface 56 which defines a portion of the rubber shaping cavity 28 and upon which an annular blank 58 of uncured rubber is placed as a preliminary step in producing a fluid seal in the disclosed apparatus.

The shell 52, appearing in FIG. 1 as before having a rubber sealing element 54 applied thereto, is a single metal piece formed with a cylindrical mounting flange 60 (FIG. 5) for mounting the seal tightly within an opening for a rod or shaft in a machine housing, this flange 60 adjoining a flat, radially inwardly extending wall 62. The latter, at its inner limit, adjoins a relatively narrow cylindrical wall or shoulder 64 the bottom of which adjoins an obliquely inwardly and upwardly extending flange 66. The width of the shoulder 64, between the radial wall 62 and the flange 66 is less than the height of the ridge 34.

In operation of the apparatus, the rubber blank 58 is placed about the centering pin 24 and upon the flat surface 56 of the lower die member 10, this being done while the upper and lower die members are widely separated (in positions not shown) before being moved toward each other to their FIG. 1 positions. Also, while the dies are thus widely separated, the metal shell 52 is placed upon the ridge 34 of the lower die member, said ridge coacting with the shell's shoulder 64 to center the shell on the die member 10 and to hold it thus centered.

Then, the upper die assembly is lowered to its FIG. 1 position wherein the centering pin 24 is about to enter the bushing 22 to assure accurate coaxiality of the several die members.

Figure 2:
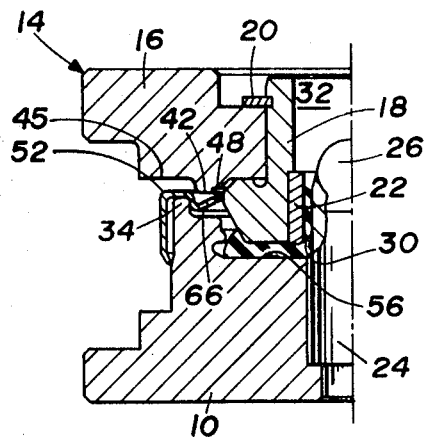
FIG. 2 is a similar sectional view of half of the parts shown in FIG. 1 (both halves being substantially alike), the parts, however, being as in a first stage of operation in which the dies have engaged and partly deformed the rubber blank.

As downward movement of the upper die assembly continues, the first effect is to start flowing of the rubber of the blank 58 as shown in FIG. 2. The flowing of the rubber is facilitated by reason of the fact that the die members are suitably heated in accordance with common practice.

Figure 3:
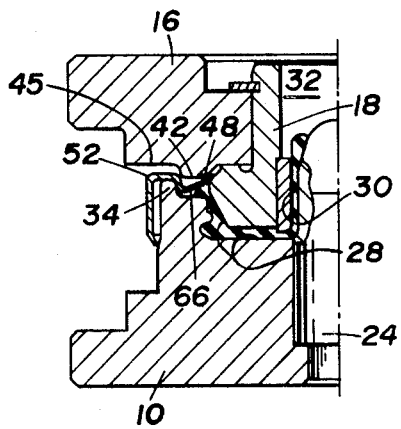
FIG. 3 is a view, substantially similar to FIG. 2, with the parts as in a second stage of operation in which the rubber blank has been further deformed and in which an upper die member is about to engage an inner marginal portion of an obliquely upwardly extending flange of the shell.

Further downward movement, to the extent indicated in FIG. 3, brings the ridge 42 of the upper die member 16 into or approximately into initial engagement with the top surface of the oblique flange 66 of the metal shell, while the continued flow of rubber leaves the latter short of possible escape from the cavity 28.

Figure 5:
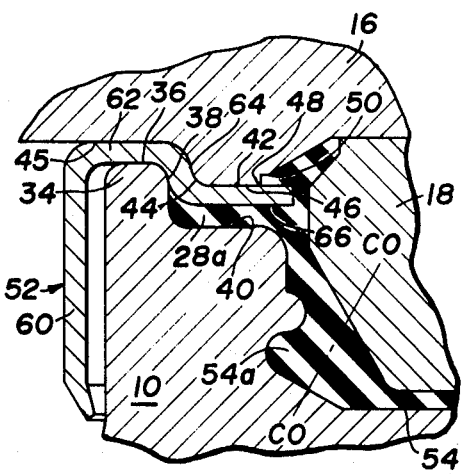
FIG. 5 is an enlargement of the part of FIG. 4 which is circled in chain lines; this figure affording the best showing of details of parts of the die members and of parts processed therein.

Still further, and final, downward movement to the die relationship shown in FIGS. 4 and 5 causes the ridge 42 to telescope to some extent into the ridge 34, meanwhile forcibly deforming the shell's oblique flange 66 downwardly to its final flat condition as shown in said figures. The final die closing movement occurs after the cavity 28 has become substantially filled. Hence, pressure is applied to the rubber; and this, with the heat of the mold, provides for completion of the molding process in a manner well understood in the molding art.

Consideration of FIGS. 3, 4 and 5 will show how the disclosed apparatus prevents objectionable flashing of rubber beyond its intended configuration, and, also, how the rubber is caused to embrace firmly the edge of the shell's flange 66 and also adjacent opposite side face areas of said flange.

Flashing of rubber at the upper face of the shell's oblique flange 66 is prevented by reason of the fact that, before the flowing rubber reaches that face, the angular and relatively sharp circular juncture of the flat surface 46 of the upper ridge 42 and the latter's shoulder 48 has entered into forceful engagement with the top surface of the oblique flange and remains in such forceful engagement throughout the ensuing operation of the several die members. The mentioned engagement is of such force that rubber cannot pass the mentioned line of engagement, hence, no flashing of rubber occurs at the top of the shell's flange 66.

As the just-mentioned line of engagement is outward of the inner edge of the flange 66, flowing rubber is free to reach an inner marginal area of the upper face of said flange to be firmly affixed thereto.

Flashing of rubber at the inner or lower side of the radial wall of the metal shell is prevented by reason of the fact that the shell's radial wall 62 is tightly engaged between surface 45 of the upper die member and the flat top surface 36 of the lower die member's ridge 34 so that flowing rubber cannot flash past the inner side of the juncture of the shell's parts 62 and 64.

As the width of the shoulder 64 is less than the height of the ridge 34, as already mentioned, the deformation of the shell's oblique flange 66 to its flat condition of FIG. 4 leaves a cavity area underneath said flange so that flowing rubber is free to enter into that area and become affixed firmly to the entire inner or under face of said flange.

A chain line CO—CO has been applied to FIG. 5 showing the line of cutoff of excess rubber after completion of the molding operation leaving a rubber sealing element of the final shape indicated at 54a.

Shown in broken lines in FIG. 4 are larger mounting flanges 60a and 60b of shells adapted for mounting in correspondingly larger sizes of rod or shaft openings in machine housings, showing that the disclosed die arrangement may be employed for making seals of different outside diameters without altering or substituting other members for the die members 10, 16 and 18.

Figure 6:
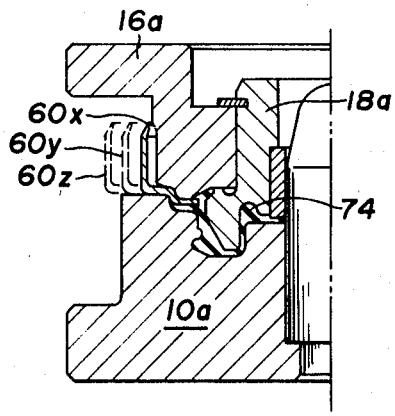
FIG. 6 is a partial, central, axial sectional view, substantially similar to FIG. 4, illustrating a modified form of apparatus of this invention.

FIG. 6 shows that, by substituting upper and lower die members 16a and 10a of different forms than corresponding members shown in FIGS. 1–5 the die apparatus may be adapted to process seals in which, as sometimes provided, mounting flange 60x (or alternatively, flange 60y or 60z) extends upwardly, i.e. out of radial alignment with the rubber sealing element.

This invention lends itself to the provision of various means for accommodating excess rubber which may be present in the blank 58. For example, FIGS. 1–4 show the flute 30 permitting escape of excess rubber to the open area 32, while FIG. 6 shows the provision, in an upper inner die member 18a, of an annular recess 74 of ample size to accommodate excess rubber.

It will be seen that the present invention causes the rubber to be molded not only to the inner edge of the oblique flange 66 of the metal shell but also to opposite sides of that flange so that the rubber is very effectively affixed to the metal shell.

It should be understood that the concepts of this invention may be practiced in various other ways, without, however, departing from the invention as set forth in the following claims.

I claim:

1. In making a fluid seal having an annular shell, of relatively thin metal, having an inner marginal flange initially extending obliquely, axially outwardly and radially inwardly at an acute angle from the axially inner limit of an approximately cylindrical shoulder portion which interconnects said flange and a flat radial wall defining a side limit of said shell, and an annular sealing element of rubber, bonded to said flange; the method of flattening said flange and molding said sealing element thereon without distorting other parts of said shell, said method comprising the steps of:

(a) applying circular abutment means intimately about a radially outer surface of said shoulder portion in radial alignment with the latter;

(b) applying flat supporting means in intimate engagement with an axially inner flat surface of said flat radial wall; and (c) simultaneously bending said flange to a flat condition and molding said sealing element thereon while said abutment and supporting means continue their said intimate association with said shoulder portion and said flat radial wall of the shell.

2. In making a fluid seal having an annular shell, of relatively thin metal, having an inner marginal flange initially extending obliquely, axially outwardly and radially inwardly at an acute angle from the axially inner limit of an approximately cylindrical shoulder portion which interconnects said flange and a flat radial wall defining a side limit of said shell, and an annular sealing element of rubber, bonded to said flange; the method of flattening said flange and molding said sealing element thereon without distoring other parts of said shell, said method comprising the steps of:

(a) applying circular abutment means intimately about a radially outer surface of said shoulder portion in radial alignment with the latter;

(b) applying flat supporting means in intimate engagement with an axially inner flat surface of said flat radial wall;

(c) holding said abutment means against radial shifting; and (d) simultaneously bending said flange to a flat condition and molding said sealing element thereon while said abutment and supporting means continue their said intimate association with said shoulder portion and said flat radial wall of the shell.

3. Apparatus for making a fluid seal having an annular shell of relatively thin metal, said shell having an inner marginal flange initially extending, at an acute angle, axially outwardly and radially inwardly from the axially inner limit of an approximately cylindrical shoulder which interconnects said flange and a flat, outwardly extending radial wall defining a side limit of said shell, and the seal having, also, an annular sealing element of rubber, bonded to said flange, said apparatus comprising:

(a) upper and lower annular die members, relatively movable axially to close them, and defining, when closed, a main annular area for confining therein and shaping portions of said shell and of rubber of said sealing element;

(b) said main annular area comprising a first annular area portion between opposed surfaces of the two die members, shaped to receive said shoulder and radial wall intimately and without material deformation thereof, and a second annular area portion, in communication with said first area portion, and of an axial dimension substantially greater than the thickness of said flange, to accommodate the latter and to leave an area thereunder for the reception of rubber of the sealing element;

(c) said lower die member being formed with an upstanding annular ridge shaped and positioned to intimately engage the inner face of said flat radial wall and the radially outer face of said shoulder during the closing of said die members to maintain said shell in concentric relation to said lower die member during such closing;

(d) said upper die member being formed with a depending annular ridge, in axial alignment with said flange, for flattening the latter, and having a circular, lower, inner marginal portion opposed to a radially intermediate portion of said flange, positioned to wipe radially outwardly on the upper face of said flange, during closing of the die members, to oppose flash of rubber past said marginal portion; and (e) the spacing apart of all opposed parts of said die members, when the latter are closed, being at least as great, approximately, as the thickness of the shell metal, to avoid weakening thinning of the latter.

4. Apparatus for making a fluid seal having an annular shell of relatively thin metal, said shell having an inner marginal flange initially extending, at an acute angle, axially outwardly and radially inwardly from the axially inner limit of an approximately cylindrical shoulder which interconnects said flange and a flat, outwardly extending radial wall defining a side limit of said shell, and the seal having, also, an annular sealing element of rubber, bonded to said flange, said apparatus comprising:

(a) upper and lower annular die members, relatively movable axially to close them, and defining, when closed, a main annular area for confining therein and shaping portions of said shell and of rubber of said sealing element;

(b) said main annular area comprising a first annular area portion between opposed surfaces of the two die members, shaped to receive said shoulder and radial wall intimately and without material deformation thereof, and a second annular area portion, in communication with said first area portion, and of an axial dimension substantially greater than the thickness of said flange, to accommodate the latter and to leave an area thereunder for the reception of rubber of the sealing element;

(c) said lower die member being formed with an upstanding annular ridge shaped and positioned to intimately engage the inner face of said flat radial wall and the radially outer face of said shoulder prior to and during the closing of said die members;

(d) said upper die member being formed with a depending annular ridge, in axial alignment with said flange, for flattening the latter, and having a relatively, sharp, circular, lower edge opposed to a radially intermediate portion of said flange, and arranged to wipe radially outwardly on the upper face of said flange, during closing of the die members, to prevent flash of rubber past said edge;

(e) the spacing apart of all opposed parts of said die members, when the latter are closed, being at least as great, approximately, as the thickness of the shell metal, to avoid weakening thinning of the latter; and (f) the downwardly directed force applied by said upper die member upon said flange during said flattening of the latter being sufficient to hold the shell's said flat radial wall and shoulder firmly in said intimate engagement with said upstanding ridge whereby to oppose deformation of parts of the shell other than said flange during closing of said die members.

References Cited

UNITED STATES PATENTS

| | | | |
|---|---|---|---|
| 3,004,298 | 10/1961 | Haynie | 18—36 X |
| 3,063,097 | 11/1962 | Jutzi | 18—36 |
| 3,090,996 | 5/1963 | Reichenbach et al. | 29—527.1 |
| 3,241,193 | 3/1966 | Pohlman | 18—36 X |
| 3,276,114 | 10/1966 | Blaurock | 29—527.1 |
| 3,276,115 | 10/1966 | Hansz | 29—527.1 |
| 3,392,226 | 7/1968 | McKinven | 18—36 X |
| 3,490,139 | 1/1970 | McKinven | 29—52.1 |

CHARLIE T. MOON, Primary Examiner

U.S. Cl. X.R.

18—36; 264—268